United States Patent [19]

Holland

[11] Patent Number: 5,007,223
[45] Date of Patent: Apr. 16, 1991

[54] BLIND ANCHORING OF WALL FIXTURES

[76] Inventor: Andrew P. Holland, 4100 Rosemary St., Chevy Chase, Md. 20815

[21] Appl. No.: 481,323

[22] Filed: Feb. 20, 1990

[51] Int. Cl.$^5$ .............................................. E04B 1/00
[52] U.S. Cl. ...................................... 52/741; 411/344
[58] Field of Search ................. 411/82, 258, 340, 344, 411/345, 346; 248/27.1, 205.3, 205.4, 467, 544; 29/402.09; 52/514, 741; 156/91

[56] References Cited

U.S. PATENT DOCUMENTS

| | | | |
|---|---|---|---|
| 2,385,296 | 9/1945 | Moore | 411/82 X |
| 3,211,042 | 10/1965 | Fischer | 411/344 |
| 3,605,547 | 9/1971 | Millet | 411/344 |
| 3,646,982 | 3/1972 | Cushman | 411/258 X |
| 4,039,134 | 8/1977 | Redmer | 248/205.3 |
| 4,297,823 | 11/1981 | Keisler | 52/514 |
| 4,408,429 | 10/1983 | Neal | 52/514 |
| 4,439,079 | 3/1984 | Losada | 411/345 |
| 4,605,292 | 8/1986 | McIntosh | 248/205.3 X |
| 4,657,461 | 4/1987 | Smith | 411/340 |
| 4,704,057 | 11/1987 | McSherry | 411/345 X |
| 4,776,906 | 10/1988 | Benard | 52/514 X |
| 4,818,604 | 4/1989 | Tock | 428/319.9 |

FOREIGN PATENT DOCUMENTS 182293 7/1922 United Kingdom ................ 411/340

Primary Examiner—Rodney M. Lindsey
Assistant Examiner—Jerry Redman
Attorney, Agent, or Firm—Wilmer Mechlin

[57] ABSTRACT

Method of blind anchoring for mounting on plasterboard or other dry wall panels having inaccessable backs, fixtures attachable by screws or bolts, the assembly having as a blind anchor member a strong stiff elongated machinable plate, as a puller a flexible string or cord passed through a central drilling in and knotted beyond the back of the plate, and a self-sticking adhesive coating on the front of the plate. Using a flange of the fixture as a marking template, an opening, within the perimeters of the flange and any screw holes therein, is cut through the wall. Sized to fit, the anchor plate with the string attached is inserted through the wall opening and after positioning manually by fingers extended through the opening, is pulled by the string against the inside of the wall. With the plate then held in position by the adhesive and the tensile force on the string, holes are drilled in the marked positions through the anchor plate for receiving the attaching screws. If the fixture is double-ended, the procedure is repeated at its other end before screwing both its ends through the wall to the then hidden anchor plates.

8 Claims, 1 Drawing Sheet

BLIND ANCHORING OF WALL FIXTURES

BACKGROUND OF THE INVENTION

As pointed out at length in McSherry et al U.S. Pat. No. 4,075,924, the prior practice of constructing building walls of plaster backed by wire or wood laths, produced substantial relatively massive wall structures capable of supporting or mounting relatively heavy objects by relatively uncomplicated fasteners attachable to walls by screws, bolts, nails and the like. However, the more modern building construction technique is to construct walls and partitions of wallboard panels. Commonly referred to as dry or hollow wall, the technique uses panels of materials such as plasterboard and beaverboard, and secures them without intermediate backing to horizontally spaced wood studs. Structurally thin and weak relative to plaster walls, plasterboard and like panels between studs are incapable, with fasteners suited for plaster walls, of sustaining substantial loads for any but brief intervals.

The economic advantages of dry or hollow wall over plaster wall construction has led to the development of innumerable blind wall fasteners for use on panels inaccessible from the back. Usually of the toggle type, with a winged or straight crosspiece threaded or threadable to a toggle bolt and insertible either folded against or disposed parallel to the bolt through an opening in the panel and then, as in the above McSherry patent, manipulated by attached arms or other usually flexible means to a position in which the crosspiece extends along the back of the panel perpendicular to the bolt.

An earlier Fischer, U.S. Pat. No. 3,211,042, resembles McSherry in having a preformed threaded central bore in its crosspiece for receiving a screw and means attached to the crosspiece for inserting it through a wall opening and then positioning it along the back of the wall.

With their common features preformed threaded bores in their crosspieces and means attached to and inserted with the crosspieces for positioning them along the backs of the wall panels, the Shamah, U.S. Pat. No. 4,286,497 is exemplary of a blind wall fastener of the foldable wing type, while the patent to McSherry U.S. Pat. No. 4,294,156 is basically the same and an improvement on his earlier U.S. Pat. No. 4,075,924.

While in essence toggles adapted by their crosspieces to sustain relatively heavy loads, the blind wall fasteners of the above patents are ill-adapted to support or mount on hollow or dry wall panels fixtures or articles, such as brackets, towel bars and paper holders, secured by screws to drilled-in-situ blind anchor plates. It is with the mounting on hollow or dry wall panels of fixtures of this type that the present invention is particularly concerned.

SUMMARY OF THE INVENTION

The primary object of the invention is to provide an improved method of dry anchoring for mounting on dry wall panels fixtures secured by screws to drilled-in-situ blind anchor plates.

Another object of the invention is to provide an improved method of dry anchoring for mounting a screw-secured fixture on a dry wall panel, the method using a machinable substantially rigid longitudinally elongated anchor plate, a flexible puller attached to and insertible with said plate through an opening in said panel, said plate after insertion being manually positioned to extend along a back of said panel beyond opposite sides or extremities of said opening, and a contact adhesive coating on a front of said plate confronting said back of said panel, an external pulling force on said puller and engagement of said adhesive with said panel back coacting to hold said plate in position during drilling of holes therein for receiving screws for fastening said fixture to said wall.

An additional object of the invention is to provide a method of blind anchoring of the character described in the immediately preceding object, wherein the flexible puller is a string extending centrally through and knotted on a side of the plate opposite the adhesive, and the adhesive is a double-sided strip adhered on an inner side to the plate and initially protected on the outer side by a peel-off cover.

A further object of the invention is to provide an improved method of blind anchoring for mounting on a dry wall panel a wall fixture having a screw-fastened base flange, wherein the method uses a blind anchor assembly having as a blind mounting member a longitudinally elongated high strength resin-cellulose laminate, as a flexible puller a strong string extending centrally through and knotted beyond a back of said mounting member, and a contact adhesive on a front of said mounting member, said member being insertible endwise through an opening in said dry wall, said member after insertion and manual positioning along an inside of said wall being pulled by said string to bond said member by said adhesive to the inside of said wall, said string pull and adhesive bond coacting to hold said member against dislodgement on drilling thereof to receive said fastening screws, and said flange serving as a template for marking on said wall positions of said screw holes and boundaries of said flange and panel opening.

Another object of the invention is to provide an improved method of blind anchoring for inexpensively and without special tooling or machining mounting on dry wall panels wall fixtures having screw-secured base flanges, wherein using a base flange as a template peripheries of the flange and screw holes therein are traced at a predetermined mounting position on the dry wall panel and on removing the flange an opening bounded by said peripheries is cut through the panel, next a longitudinally elongated high strength stiff anchor plate of a size to pass endwise through said opening and having on at least end portions of a longitudinally elongated front a double-sided adhesive tape initially protected by a peel-off cover, inserting through a central aperture in said plate a strong string attached thereto by being knotted at a back thereof, inserting said plate endwise entirely through and said attached string partly through said opening, while pulling with one hand on said string, with the other hand positioning the plate to extend vertically along said panel beyond opposite sides of said opening and holding said plate in said position by contact of said tape with the confronting inside of said panel, while still tensioning the string drilling holes through said panel and plate of a size in said plate to retain said flange screws, repeating said steps for the other flange if the fixture is double-ended, and finally securing said fixture to said panel by screwing the flange screws into the drilled holes in each of the anchor plates.

Other objects and advantages of the invention will appear hereafter in the detailed description, be particu-

FIGURE DESCRIPTION

Figure 1:
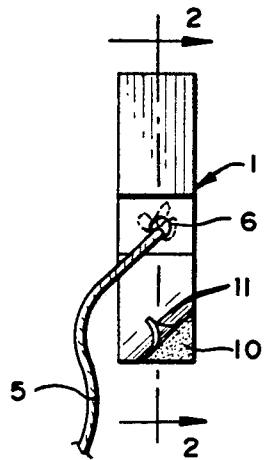
FIG. 1 is a front elevational view of a preferred embodiment of the blind anchor assembly used in the method of the present invention.
Figure 2:
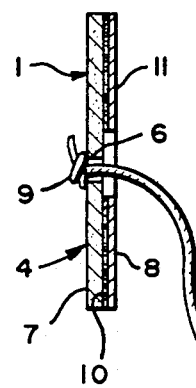
FIG. 2 is a side elevational view of the assembly of FIG. 1.
Figure 3:
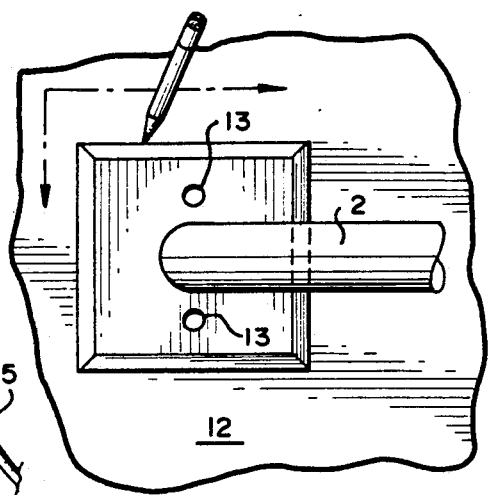
FIG. 3 is a front elevational view showing use of a base flange of a towel rack or other flanged wall fixture for tracing in pencil on a dry wall panel the perimeters of the flange and screw holes therein in the position in which the fixture is to be mounted.
Figure 5:
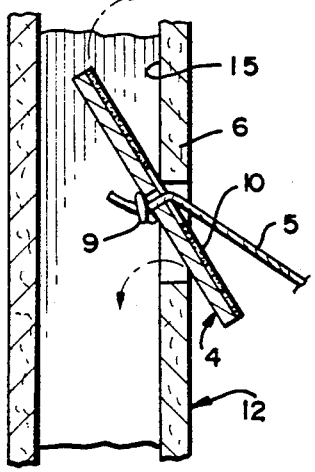
FIG. 5 is a fragmentary vertical sectional view showing the assembly being inserted though the wall opening into a hollow space between adjoining panels.
Figure 6:
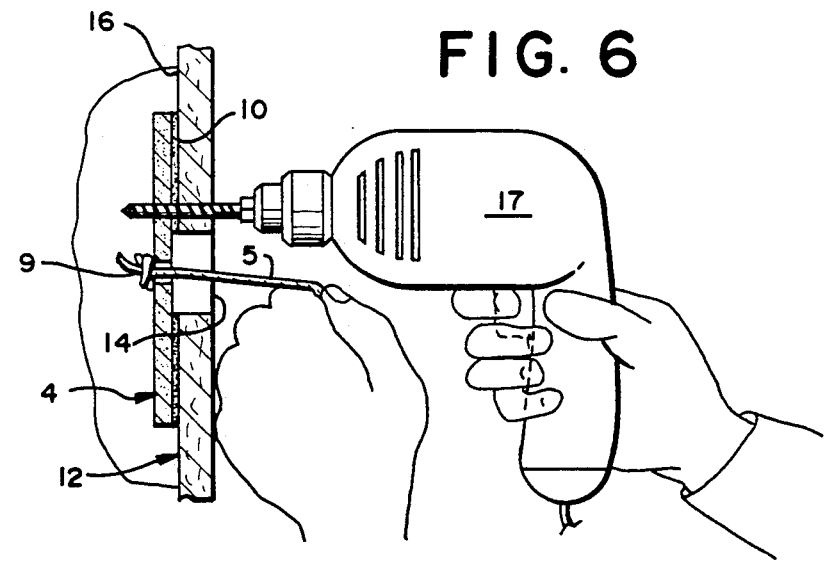
Figure 7:
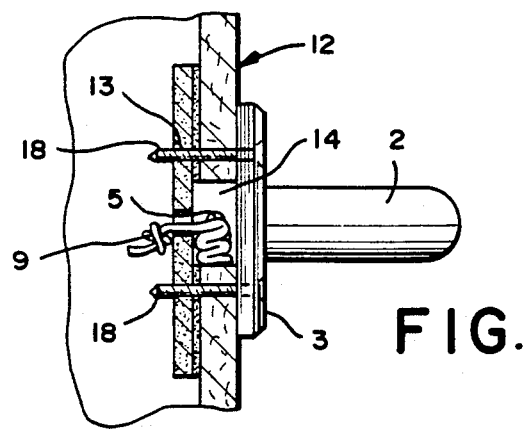

FIG. 6 is a fragmentary view on the section of FIG. 5 showing the anchor plate in operative position and held in that position by a pulling force on the string and adhesion of the adhesive on the plate with the back of the panel, while screw holes are being drilled at preselected positions through the wall panel and the anchor plate; and FIG. 7 is a view on the section of FIG. 6 showing a base flange of a wall fixture secured by screws extending from the flange through the wall panel into and through the anchor plate and the string on the plate tucked into the wall opening through which the plate was inserted.

DETAILED DESCRIPTION

Referring now in detail to the drawings in which like reference characters designate like parts, the blind anchoring method of the present invention is particularly designed to mount or support on a panel of a dry or hollow wall a wall fixture screw or bolt-attached to a blind anchor and will be so described as exemplary of the invention.

Designated as 1, the blind anchor assembly used in the method of the present invention is adapted to mount or support wall fixtures 2, such as brackets, towel bars, paper holders and other wall-mountable articles or devices that are attached or secured by screws or bolts and particularly fixtures that have or are fitted with base flanges or feet 3. The assembly is comprised of a longitudinally elongated anchor plate or member 4 that is strong, stiff and machinable. The preferred anchor plate material, BENELUX, made by MASONITE Corporation, not only has these properties but also is grainless and of high tensile, shear and flexural strength and uniform hardness. A lignin-resin cellulose laminate, BENELUX has the further advantage in the intended use of low cost.

The assembly 1 also includes a flexible puller member 5, preferably in the form of a string or cord of suitable tensile strength. Attached by being passed through a drilling or bore 6 centered on the anchor plate 4, the string is knotted at the back 7 and extends beyond the front 8 of the plate, with the knot 9 too big to slip through the drilling 6 under a pulling force on the string. The assembly further includes a self-sticking or contact adhesive 10 adhered or bonded to the plate's front 8 and preferably applied as longitudinally spaced coatings on and desirably covering opposite longitudinal end portions of the front. Conveniently, the adhesive coatings 10 are strips of double-sided adhesive tape initially protected in shipping and handling by peel-off covers 11.

Figure 4:
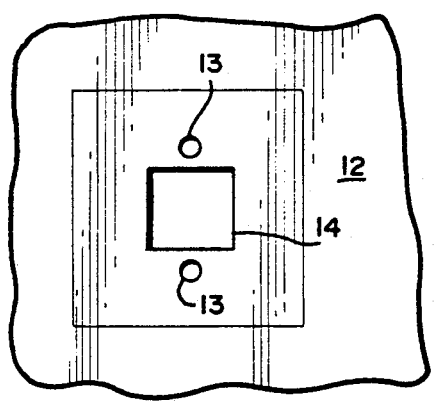
FIG. 4 is a view of the panel fragment of FIG. 3 with the base flange removed showing the opening cut inside the perimeter tracings for inserting an anchor plate of the assembly through the wall panel.

In the use for which the blind anchoring method is particularly designed, the mounting of screw or bolt-secured wall fixtures 2 on plasterboard or dry wall panels 12, if, as typical, the fixture is flange-based, the flange 3 or each flange, if the fixture is double-ended, such as the fragmentally illustrated towel rack, conveniently serves as a template for marking or tracing on the panel the outlines or perimeters of the flange and any screw holes 13 therein in the fixture's mounted position. On completion of the tracings, the flange 3 is removed, exposing the traced perimeters, as shown in FIG. 4, and a rectangular or other suitable wall opening 14 of dimensions contained or within the traced perimeters, is cut through the panel 12.

Of a size and particularly a width to fit through the wall opening 14, the anchor plate 4, after removing the peel-off covers 11, is inserted or introduced endwise through the opening with its front or trailing side 8 presented to the inside or back 15 of the panel 12. With one hand holding part of the string 5 that trails or extends back through the wall opening 14, the other hand with its fingers engages the plate's front 8 in the clear or adhesive-free space 15 between the adhesive coatings 10 and manipulates or positions it preferably vertically along the panel and bracketing or straddling the opening 14. At this stage the anchor plate 4, particularly when made of the preferred BENELUX, may be either flat or arched or bowed centrally away from the panel's inside or back 16. In either case the string is pulled or tensioned to stick or adhere the plate to the panel's back by contact or engagement therewith of the adhesive coatings 10. While still maintaining tension with one hand on the string 5, the other hand with a drill 17 drills screw holes 13 in the marked positions through the panel 12 and plate 4 using a bit suitably one size under the size of the retaining screws 18. Lastly, with the anchor plate 4 now firmly bonded to the panel 12 by the adhesive 10, the string 5 is tucked into the wall opening and, after repeating the above procedure for any other flange, the fixture is screwed or bolted in place to the one or more anchor plates 4.

From the above detailed description it will be apparent that there has been provided an improved method of blind anchoring which is inexpensive and easy to produce and install, does not require special tooling or machining and, by distributing or spreading the load of or on a fixture it mounts over a substantial area of a dry wall or like panel, both protects the panel against breakage and holds the fixture firmly thereon. It should be understood that the described and disclosed embodiment is merely exemplary of the invention and that all modifications are intended to be included that do not depart from the spirit of the invention and the scope of the appended claims.

Having now described my invention, I claim:

1. A method of blind anchoring for mounting a screw-securable fixture on a dry wall panel having an inaccessible inner surface, comprising marking on the panel in a selected location positions of any screw holes in a base flange of said fixture, cutting an opening through said panel inside said hole markings, inserting through said opening a longitudinally elongated stiff machinable plate member trailing a strong flexible string extending substantially centrally through and beyond a back of said member and having on a trailing side thereof a self-sticking adhesive coating, manipulating said plate member through said opening into position to back said hole markings, pulling said plate member by said string to adhere the adhesive coating to said inner surface of said panel, and, while holding said plate member in position by said adhesive and pull on said string, drilling holes in situ in said plate member through said panel in said marked positions for anchoring said fixture on said panel by screw means secured to said plate member.

2. A method of blind anchoring for mounting on a dry wall panel having an inaccessable inner surface of a fixture securable by threaded fastener means, comprising marking on the panel in, a selected location positions of any holes for said fastener means in a mounting base of said fixture, cutting an opening through said panel inside said hole markings, inserting through said opening a longitudinally elongated substantially rigid machinable plate member trailing a strong flexible string extending substantially through and knotted beyond a back of said member and having on a face thereof a self-sticking adhesive coating, and, after pulling said plate member by said string into position against an inner surface of said panel, in situ drilling said plate member through said panel in said marked positions for receiving said threaded fastener means for securing said fixture to said panel.

3. A method of blind anchoring according to claim 2, wherein the fixture includes at least one base flange secured by said screw means to said plate member, and said flange is used as a template for marking said flange and any screw holes therein on said panel in the selected mounting position of said fixture before cutting the opening in the panel.

4. A method according to claim 2, wherein the plate member is flat.

5. A method according to claim 2, wherein the plate on insertion is centrally bowed outwardly away from the inner surface of the panel.

6. A method according to claim 2, wherein the adhesive coating is a double-sided adhesive strip initially protected by a peel-off cover.

7. A method according to claim 6, wherein there are a pair of adhesive strips on opposite longitudinal end portions of the plate and longitudinally spaced for presenting an adhesive-free area for manual positioning of the plate relative to the panel.

8. A method of blind anchoring for mounting a dry wall panel having an inaccessable inner surface a fixture securable by threaded fastener means, comprising inserting through an opening in said panel a longitudinally elongated tough dense machinable plate trailing a flexible string passed centrally from front to back through and knotted back of said plate, said plate having on a front thereof an adhesive coating, drawing said plate by said string against an inner surface of said panel, and, with said plate held in position against said inner surface by said string and adhesive, in situ drilling said plate through said panel for receiving therethrough said threaded fastener means for securing said fixture to said panel.

* * * * *